Oct. 9, 1928. 1,686,945
J. S. ABERCROMBIE
WEIGHT REGULATING DEVICE
Filed July 1, 1927
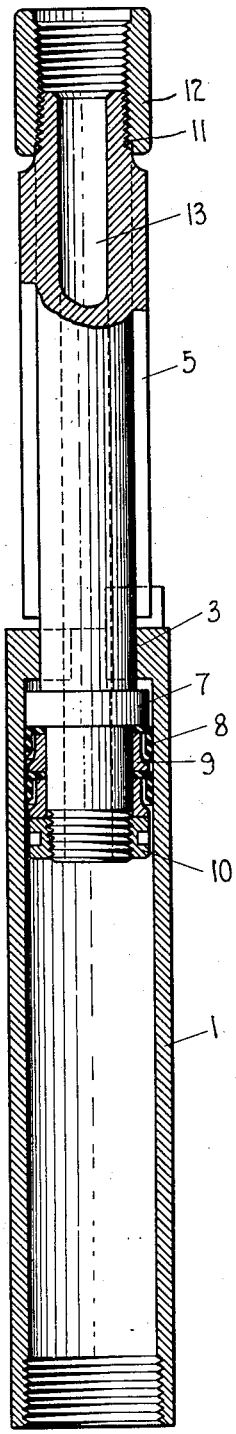
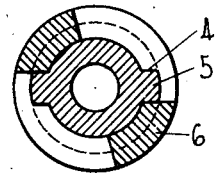
Fig.3.
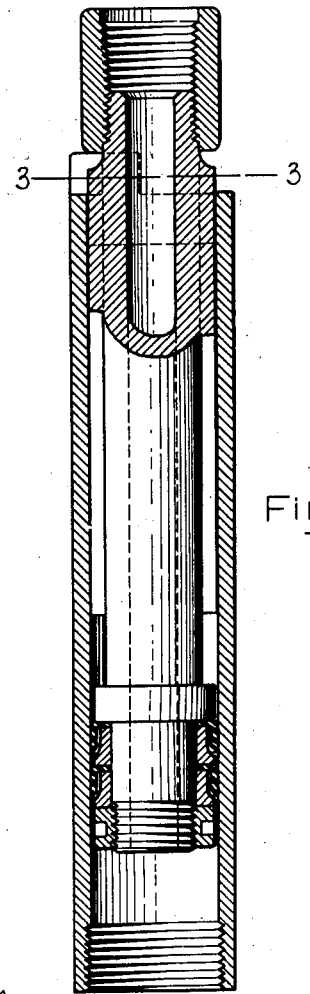
Fig.2.
Fig.1.
James S. Abercrombie INVENTOR.
BY Jesse R. Stone
ATTORNEYS.

Patented Oct. 9, 1928.

1,686,945

UNITED STATES PATENT OFFICE.

JAMES S. ABERCROMBIE, OF HOUSTON, TEXAS.

WEIGHT-REGULATING DEVICE.

Application filed July 1, 1927. Serial No. 202,887.

My invention relates to devices to be employed in deep well operations in screwing up or releasing connections in the well; where the weight must be regulated within certain limits.

In setting or withdrawing packers, anchors, or other similar tools in deep wells it is desirable and necessary for accurate and successful making or unmaking threaded connections between the points of a joint, that the weight on the connection be regulated so as not to be excessive. Where the operation is being performed several thousand feet below the surface the pipe or drill-stem above the connection may be several tons, and if this weight is allowed to rest upon the joint where the connection or release is to be made, the operation will often result in failure and mutilation of the tools.

It is an object of my invention to provide a device whereby the weight resting upon the joint to be made or released may be regulated to a comparatively light pressure so as to assure accurate and complete operations at the joint without injury to the tools.

It is desired that a telescopic or sliding connection be employed in the operating stem, the lower member of which has only a predetermined light weight which will not injure the coupling when said coupling is operated upon.

Referring to the drawing herewith, Fig. 1 is a side view partly in elevation and partly in section of my setting device. Fig. 2 is a similar view showing the parts in different relative positions; and Fig. 3 is a transverse section on the plane 3—3 of Fig. 2.

The drawing shows one form which my invention may take. There are two tubular sections, one of which fits slidably but nonrotatably in the other, thus assuring that the sections be capable of delivering a rotating drive, but allowing vertical play between the sections.

The lower section 1 is of sufficient internal diameter to receive the upper mandrel section. The section 1 is an operating nipple threaded at its lower end for engagement directly with the section to be screwed up or unscrewed or it may be attached to any special tool for handling the operation.

The upper end of the nipple 1 has an inwardly extending flange 3 in which are cut two opposite recessess 4 to slidably receive the keys or fins 5 upon the mandrel. Above the flange 3 and on the clockwise side of said recesses are upstanding lugs 6 which are sector shaped, as seen in Fig. 3.

The mandrel 2 is of heavy tubular construction, the body of which is of the proper external diameter to fit within the flanged end of the nipple. Spaced from the lower end is a radial flange or rib 7 to engage below the flange 3 of the nipple. Below the rib 7 the mandrel is of slightly smaller external diameter to form a seat for packing cups 8, spaced apart and held rigidly by spacers 9. The lower of the two spacers bears against a nut 10, screwed upon the lower end of the mandrel, and acting to clamp the spacers and packing cups upon the mandrel.

There are two opposite keys or fins 5 upon the mandrel extending from the threaded upper end 11 downwardly to a point spaced upwardly from the rib 7 so as to provide space between the lower ends of the keys and the rib 7 for the flange 3 on the nipple. The upper threaded end 11 is connected by means of a coupling 12 to the drillstem or other pipe which may be employed for connecting the same with the surface.

The connection between the mandrel and the nipple allows the water to be discharged downwardly through a central passage in the mandrel without leakage between the mandrel and nipple through means of the packing cups 8 previously referred to. The mandrel may slide within the nipple when the keys 5 have been rotated into registration with the slots 4 in the flange 3. The mandrel may then be telescoped downwardly until the collar 12 rests upon the lugs 6 as shown in Fig. 2. When the mandrel is withdrawn to its upper limit where the rib 7 engages with the flange 3 the mandrel may be rotated relative to the nipple so as to bring the keys 5 out of registration with the recesses 4 and when in this position downward pressure upon the mandrel will be exerted directly upon the nipple through the keys 5. It will be also noted that when the keys 5 are rotated into contact with the lugs 6, a rotative movement may be communicated from the mandrel to the nipple.

In the operation of this device it may be understood that a setting tool is to be screwed into the upper end of a packer so that the packer may be released. In making this connection the setting tool will be engaged at the lower end of the nipple, and the nipple will be connected at the lower end of the drillstem. When the device is lowered into the well the keys 5 will be moved out of registration, with the slots 4 in the flange 3. The device may then be lowered into the proper position into the well and the mandrel will then be rotated to bring the keys 5 into registration with the slots 4. This will allow the mandrel to be forced downwardly into the nipple and the tool will be left in this position while the threaded connection is being made. It will be possible thereafter to rotate the tool in the well and the weight resting upon the threaded connection with the setting tool will be only the weight of the nipple, the total weight of the drillstem above being supported from the surface. The connection may thus be made quickly and accurately without danger of mutilating the threads. It will be obvious that a disconnection between the parts of a threaded joint may also be made with the use of my device.

The advantage of this invention lies in the fact that the operator is enabled to screw up or unscrew joints at great depths in the well without danger of resting too heavy a weight upon the joint. The connecting or disconnecting of two threaded members in the well may be made without injury to the coupling, and operations of this sort will be positively and accurately made without danger of failure due to mutilation of the threads.

Having thus described my invention, what I claim as new and desire to protect by Letters Patent is:

1. In a device of the character described a nipple, an inwardly directed flange thereon having opposite keyways therein, a mandrel slidable in said nipple, keys on said mandrel fitting in said keyways, means on said mandrel engaging said flange to limit the movement longitudinally of said mandrel in said nipple, said keys being freed from said flange when the mandrel is at its upper limit of movement in said nipple whereby said mandrel may rotate slightly relative to said nipple, and means to limit said rotation and guide said keys into said keyways.

2. In a device of the character described, a nipple, an upper flange thereon directed inwardly, a mandrel slidable vertically therein, a circumferential rib on said mandrel adapted to engage below said flange, packing means on said mandrel below said rib, means on said mandrel to engage said flange and communicate a rotating movement to said nipple when said mandrel has been moved downwardly therein, and opposite lugs on the upper end of said nipple to be engaged by said rotating means when said mandrel is at the upper limit of its movement.

In testimony whereof I hereunto affix my signature this 24th day of June A. D. 1927.

JAMES S. ABERCROMBIE.